(12) United States Patent
Zhou et al.

(10) Patent No.: US 8,741,178 B2
(45) Date of Patent: Jun. 3, 2014

(54) BLUE LIGHT EMITTING GLASS AND PREPARATION METHOD THEREOF

(75) Inventors: Mingjie Zhou, Shenzhen (CN); Wenbo Ma, Shenzhen (CN); Zhaopu Shi, Shenzhen (CN)

(73) Assignee: Ocean's King Lighting & Technology Co., Ltd., Shenzhen (CN)

( * ) Notice: Subject to any disclaimer, the term of this patent is extended or adjusted under 35 U.S.C. 154(b) by 206 days.

(21) Appl. No.: 13/377,569

(22) PCT Filed: Jun. 25, 2009

(86) PCT No.: PCT/CN2009/072446
§ 371 (c)(1),
(2), (4) Date: Dec. 12, 2011

(87) PCT Pub. No.: WO2010/148562
PCT Pub. Date: Dec. 29, 2010

(65) Prior Publication Data
US 2012/0091394 A1    Apr. 19, 2012

(51) Int. Cl.
C03C 3/068    (2006.01)
C03C 3/095    (2006.01)
C03C 4/12     (2006.01)

(52) U.S. Cl.
USPC ............ 252/301.4 F; 501/64; 501/70; 501/73

(58) Field of Classification Search
USPC ........................ 252/301.4 F; 501/64, 70, 73
See application file for complete search history.

(56) References Cited

U.S. PATENT DOCUMENTS 4,751,148 A * 6/1988 Popma et al. ............ 428/690
6,300,264 B1 * 10/2001 Ohara ...................... 501/64

FOREIGN PATENT DOCUMENTS

CN    1364738    *  8/2002

OTHER PUBLICATIONS

Translation for CN 1364738, Aug. 2002.*
International Search Report of PCT Patent Application No. PCT/CN2009/072446.

* cited by examiner

*Primary Examiner* — Carol M Koslow

(57) ABSTRACT

Blue light emitting glass and the preparation method thereof are provided. The blue light emitting glass has the following composition: $aCaO \cdot bAl_2O_3 \cdot cSiO_2 \cdot xCeO_2$, wherein a, b, c and x are, by mol part, 15-55, 15-35, 20-60 and 0.01-5 respectively. The preparation method comprises: weighing the raw materials according to the composition of the blue light emitting glass; mixing the raw materials uniformly and melting the raw materials to obtain glass melt; molding the glass melt to obtain transparent glass; thermally treating the transparent glass under reducing atmosphere, and thereafter obtaining the finished product. The blue light emitting glass obtained has intense broadband excitation spectrum in ultraviolet region and emits intense blue light under the excitation of ultraviolet light. It is suitable for using as luminescent medium material.

7 Claims, 1 Drawing Sheet

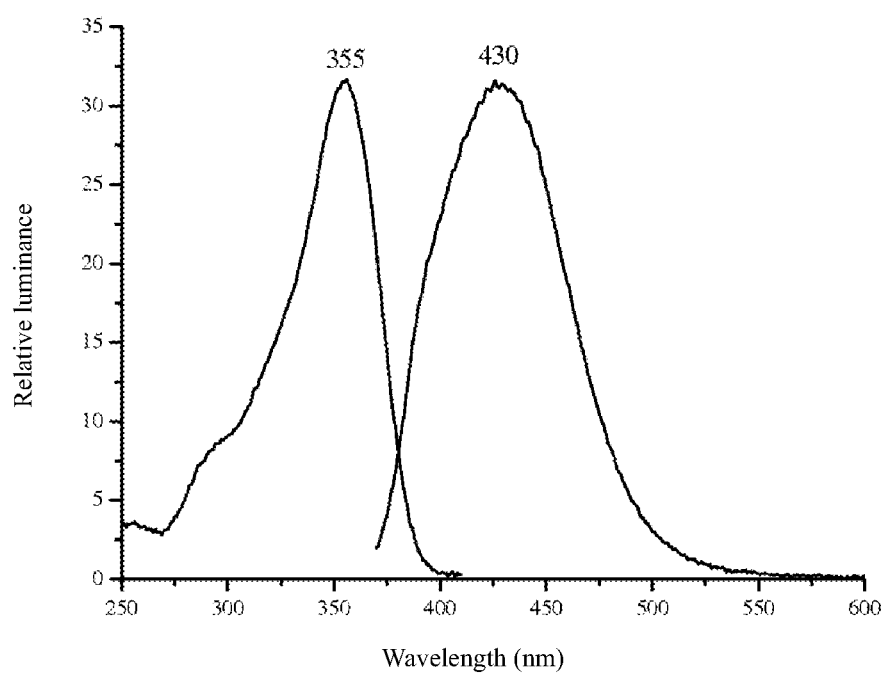

BLUE LIGHT EMITTING GLASS AND PREPARATION METHOD THEREOF

FIELD OF THE INVENTION

The present invention relates to the technical fields of microelectronics and lighting, more particularly, relates to a blue light emitting glass and preparation method thereof.

BACKGROUND OF THE INVENTION

With the development of semiconductor lighting technology, such revolutionary new light source, i.e. LED (light emitting diode), has come into our daily life gradually. As a new-type lighting technology, LED can be applied into varieties of fields such as indication, display, decoration, backlight and general lighting due to its numerous advantages including energy conservation, green environmental protection and flexible application etc. When the third generation semiconductor material gallium nitride is used as the semiconductor lighting source, its power consumption is only one-tenth of that of a common incandescent lamp under the same brightness, and its lifetime can reach more than 100,000 hours as well, which is to bring about a revolution in the lighting field.

At present, most commercial white light LED lighting devices are realized by the cooperation between blue light LED chips and fluorescent powders which are capable of emitting yellow, green or orange light when excited by blue light. Such kind of fluorescent powder luminescent material has higher luminous efficiency and matured preparation method. However, the light source devices manufactured by this method has the following drawbacks: (1) the epoxy resin for encapsulation is easy aging, thus reducing the device lifetime; (2) its process is complex and cost is high; (3) the color coordinate is unstable and the white light is easy to drift.

Compared with a fluorescent powder, the glass that can achieve a light emission when excited by the blue-purple light has the following significant advantages: (1) excellent transmittance; (2) excellent chemical stability and thermostability; (3) simple preparation process and low cost; (4) easily made into big bulk and different shapes; (5) capable of replacing the epoxy resin. Since these features, the glass capable of achieving a high-performance luminescence is very suitable as the luminescent material in the LED lighting field.

However, for the light emitting glass in the existing technology, many light-emitting active ions in the glass has very low luminous intensity or can not even shine since the limitation of glass preparation condition and glass structure.

SUMMARY OF THE INVENTION

The objective of the present invention is to provide a blue light emitting glass which has excellent luminescent properties and can emit light when excited by the ultraviolet light, aiming at the technical drawbacks of the fluorescent powder and light emitting glass in the prior art.

Another objective of the present invention is to provide a preparation method for the above-mentioned blue light emitting glass, aiming at the problems that the preparation method for the light emitting glass is limited by the glass preparation condition and the light-emitting active ions in the glass has very low luminous intensity or can not even shine in the existing technology.

According to an aspect, a blue light emitting glass having a composition of $aCaO \cdot bAl_2O_3 \cdot cSiO_2 \cdot xCe_2O_3$ is provided; wherein the ranges of a, b, c and x are 15~55 by mol part, 15~35 by mol part, 20~60 by mol part and 0.01~5 by mol part, respectively.

In the blue light emitting glass of the present invention, the ranges of the a, b, c and x are 25~50 by mol part, 15~30 by mol part, 25~50 by mol part and 0.01~2 by mol part, respectively.

According to another aspect, a preparation method for blue light emitting glass is provided, comprising following steps:

weighting: weighing raw materials of $CaCO_3$, $Al_2O_3$, $SiO_2$ and $CeO_2$ in accordance with a composition of $aCaO \cdot bAl_2O_3 \cdot cSiO_2 \cdot xCe_2O_3$; wherein ranges of a, b, c and x are 15~55 by mol part, 15~35 by mol part, 20~60 by mol part and 0.01~5 by mol part, respectively;

melting: mixing weighed raw materials uniformly and then melting the raw materials to obtain glass melt;

molding: —preserving the glass melt for 0.5~3 h at a temperature at which the glass melt is obtained, then pouring the glass melt into a cast mold and pressing it to obtain the transparent glass;

post-treating: preserving the transparent glass for 3~20 h under reducing atmosphere at a temperature that has risen to 650~1050° C., then cooling the transparent glass to room temperature and obtaining the blue light emitting glass.

In the preparation method for blue light emitting glass of the present invention, the ranges of the a, b, c and x are 25~50 by mol part, 15~30 by mol part, 25~50 by mol part and 0.01~2 by mol part, respectively.

In the preparation method for blue light emitting glass of the present invention, a purity of the raw materials is no less than analytical purity.

In the preparation method for blue light emitting glass of the present invention, the melting step comprises: mixing the weighed raw materials uniformly and pouring them into a corundum crucible or a platinum crucible, placing the corundum crucible or platinum crucible with the raw materials into a high-temperature box-type furnace, melting the raw materials in the high-temperature box-type furnace to obtain the glass melt.

In the preparation method for blue light emitting glass of the present invention, the heating temperature in the high-temperature box-type furnace is 1500~1700° C.

In the preparation method for blue light emitting glass of the present invention, the post-treating step comprises: placing the transparent glass in an annealing furnace, preserving the transparent glass for 2~20 h under reducing atmosphere at a temperature that has risen to 650~1050° C., cooling the transparent glass to room temperature and then obtaining the blue light emitting glass; wherein the reducing atmosphere is CO, $H_2$, a mixed gas of $N_2$ and $H_2$ or an atmosphere with carbon inside.

In the preparation method for blue light emitting glass of the present invention, the reducing atmosphere is a mixed gas composed of 95% $N_2$ and 5% $H_2$ in volume ratio or composed of 97% $N_2$ and 3% $H_2$ in volume ratio.

The advantageous effect of the present invention is as follows: the preparation method for blue light emitting glass of the present invention is used for preparing the blue light emitting glass. It is simple in process, strong in pertinency, and manageable in its process condition. The blue light emitting glass prepared through this method has intense broadband excitation spectrum in ultraviolet region and emits intense blue light under the excitation of ultraviolet light. It is suitable for using as luminescent material as well.

BRIEF DESCRIPTION OF THE DRAWINGS

The present invention will be further described with reference to the accompanying drawings and embodiments in the following. In the Figures:

FIG. 1 is the excitation spectrum and emission spectrum for the light emitting glass prepared in the example 3 of the present invention.

DETAILED DESCRIPTION OF THE PREFERRED EMBODIMENT

Example 1

Preparation of $55CaO.25Al_2O_3.20SiO_2.0.8Ce_2O_3$ 27.54 g calcium carbonate ($CaCO_3$), 12.82 g alumina ($Al_2O_3$), 6.04 g silica ($SiO_2$) and 0.68 g cerium oxide ($CeO_2$) are weighed to be raw materials respectively. The weighed raw materials (the purity of the raw materials is no less than analytical purity) are mixed and ground uniformly in a mortar and placed in a platinum crucible thereafter. Then the platinum crucible with the raw materials is placed into a high-temperature box-type furnace. When the temperature rises to 1700° C. therein, the raw materials melt into glass melt and preserve said glass melt for 1 h at 1700° C. After that, the glass melt is poured into a cast mold to be pressed into transparent glass. Then the transparent glass is placed in an annealing furnace and preserved for 20 h under a reducing atmosphere of 95% $N_2$ and 5% $H_2$ (i.e. a mixed gas of 95% $N_2$ and 5% $H_2$ in volume ratio) at a temperature that has risen to 650° C. Subsequently, the light emitting glass with a composition of $55CaO.25Al_2O_3.20SiO_2.0.8Ce_2O_3$ is obtained after cooling to room temperature, which can emit blue light when excited by the ultraviolet light.

Example 2

Preparation of $50CaO.25Al_2O_3.25SiO_2.0.01Ce_2O_3$ 21.89 g calcium carbonate ($CaCO_3$), 11.15 g alumina ($Al_2O_3$), 6.57 g silica ($SiO_2$) and 0.006 g cerium oxide ($CeO_2$) are weighed to be raw materials respectively. The weighed raw materials (the purity of the raw materials is no less than analytical purity) are mixed and ground uniformly in a mortar and placed in a platinum crucible thereafter. Then the platinum crucible with the raw materials is placed into a high-temperature box-type furnace. When the temperature rises to 1650° C. therein, the raw materials melt into glass melt and preserve said glass melt for 0.5 h at 1650° C. After that, the glass melt is poured into a cast mold to be pressed into transparent glass. Then the transparent glass is placed in an annealing furnace and preserved for 3 h under a reducing atmosphere of CO at a temperature that has risen to 950° C. Subsequently, the light emitting glass with a composition of $50CaO.25Al_2O_3.25SiO_2.0.01Ce_2O_3$ is obtained after cooling to room temperature, which can emit blue light when excited by the ultraviolet light.

Example 3

Preparation of $42CaO.15Al_2O_3.43SiO_2.0.5Ce_2O_3$ 19.46 g calcium carbonate ($CaCO_3$), 7.08 g alumina ($Al_2O_3$), 11.96 g silica ($SiO_2$) and 0.039 g cerium oxide ($CeO_2$) are weighed to be raw materials respectively. The weighed raw materials (the purity of the raw materials is no less than analytical purity) are mixed and ground uniformly in a mortar and placed in a corundum crucible thereafter. Then the corundum crucible with the raw materials is placed into a high-temperature box-type furnace. When the temperature rises to 1600° C. therein, the raw materials melt into glass melt and preserve said glass melt for 2 h at 1600° C. After that, the glass melt is poured into a cast mold to be pressed into transparent glass. Then the transparent glass is placed in an annealing furnace and preserved for 5 h under a reducing atmosphere of $H_2$ at a temperature that has risen to 1000° C. Subsequently, the light emitting glass with a composition of $42CaO.15Al_2O_3.43SiO_2.0.05Ce_2O_3$ is obtained after cooling to room temperature, which can emit blue light when excited by the ultraviolet light. As shown in FIG. 1, it is the spectrum for the light emitting glass prepared in the example. As shown in the FIGURE, the main excitation peak of the light emitting glass prepared in the example is 355 nm; a broadband emission spectrum at 365-520 nm is obtained under the excitation at 355 nm, wherein the main emission peak is at 430 nm.

Example 4

Preparation of $33CaO.33Al_2O_3.34SiO_2.0.1Ce_2O_3$ 13.61 g calcium carbonate ($CaCO_3$), 13.87 g alumina ($Al_2O_3$), 8.42 g silica ($SiO_2$) and 0.069 g cerium oxide ($CeO_2$) are weighed to be raw materials respectively. The weighed raw materials (the purity of the raw materials is no less than analytical purity) are mixed and ground uniformly in a mortar and placed in a corundum crucible thereafter. Then the corundum crucible with the raw materials is placed into a high-temperature box-type furnace. When the temperature rises to 1550° C. therein, the raw materials melt into glass melt and preserve said glass melt for 3 h at 1550° C. After that, the glass melt is poured into a cast mold to be pressed into transparent glass. Then the transparent glass is placed in an annealing furnace and preserved for 10 h under a reducing atmosphere of 97% $N_2$ and 3% $H_2$ (i.e. a mixed gas of 97% $N_2$ and 3% $H_2$ in volume ratio) at a temperature that has risen to 900° C. Subsequently, the light emitting glass with a composition of $33CaO.33Al_2O_3.34SiO_2.0.1Ce_2O_3$ is obtained after cooling to room temperature, which can emit blue light when excited by the ultraviolet light.

Example 5

Preparation of $25CaO.15Al_2O_3.60SiO_2.1Ce_2O_3$ 10.93 g calcium carbonate ($CaCO_3$), 6.89 g alumina ($Al_2O_3$), 16.25 g silica ($SiO_2$) and 0.77 g cerium oxide ($CeO_2$) are weighed to be raw materials respectively. The weighed raw materials (the purity of the raw materials is no less than analytical purity) are mixed and ground uniformly in a mortar and placed in a corundum crucible thereafter. Then the corundum crucible with the raw materials is placed into a high-temperature box-type furnace. When the temperature rises to 1500° C. therein, the raw materials melt into glass melt and preserve said glass melt for 1 h at 1500° C. After that, the glass melt is poured into a cast mold to be pressed into transparent glass. Then the transparent glass is placed in an annealing furnace and preserved for 10 h under a reducing atmosphere with the presence of carbon powder inside at a temperature that has risen to 1050° C. Subsequently, the light emitting glass with a composition of $25CaO.15Al_2O_3.60SiO_2.1Ce_2O_3$ is obtained after cooling to room temperature, which can emit blue light when excited by the ultraviolet light.

Example 6

Preparation of $15CaO.35Al_2O_3.45SiO_2.5Ce_2O_3$ 5.64 g calcium carbonate ($CaCO_3$), 13.42 g alumina ($Al_2O_3$), 10.17 g silica ($SiO_2$) and 3.23 g cerium oxide ($CeO_2$)

are weighed to be raw materials respectively. The weighed raw materials (the purity of the raw materials is no less than analytical purity) are mixed and ground uniformly in a mortar and placed in a platinum crucible thereafter. Then the platinum crucible with the raw materials is placed into a high-temperature box-type furnace. When the temperature rises to 1600° C. therein, the raw materials melt into glass melt and preserve said glass melt for 1 h at 1600° C. After that, the glass melt is poured into a cast mold to be pressed into transparent glass. Then the transparent glass is placed in an annealing furnace and preserved for 5 h under a reducing atmosphere of 95% $N_2$ and 5% $H_2$ at a temperature that has risen to 950° C. Subsequently, the light emitting glass with a composition of $15CaO.35Al_2O_3.45SiO_2.5Ce_2O_3$ is obtained after cooling to room temperature, which can emit blue light when excited by the ultraviolet light.

Various aspects mentioned above are the preferred specific implementations of the present invention. But the scope of protection of the present invention should not be limited to those aspects. Within the technical scope disclosed in the present, the artisans familiar with the technical field can think of any modifications or replacement readily, which are all included in the scope of protection of the present invention. Therefore, the scope of protection of the present invention should be in the light of the scope of protection of the claims.

The invention claimed is:

1. A preparation method for blue light emitting glass, comprising following steps:
    weighting: weighing raw materials of $CaCO_3$, $Al_2O_3$, $SiO_2$ and $CeO_2$ in accordance with a composition of $aCaO.bAl_2O_3.cSiO_2.xCe_2O_3$; wherein ranges of a, b, c and x are 15~55 by mol part, 15~35 by mol part, 20~60 by mol part and 0.01~5 by mol part, respectively;
    melting: mixing weighed raw materials uniformly and then melting the raw materials to obtain glass melt;
    molding: preserving the glass melt for 0.5~3 h at a temperature at which the glass melt is obtained, then pouring the glass melt into a cast mold and pressing it to obtain the transparent glass;
    post-treating: preserving the transparent glass for 3~20 h under reducing atmosphere at a temperature that has risen to 650~1050° C., then cooling the transparent glass to room temperature and obtaining the blue light emitting glass.

2. The preparation method for blue light emitting glass according to claim 1, wherein the ranges of a, b, c and x are 25~50 by mol part, 15~30 by mol part, 25~50 by mol part and 0.01~2 by mol part, respectively.

3. The preparation method for blue light emitting glass according to claim 1, wherein a purity of the raw materials is no less than analytical purity.

4. The preparation method for blue light emitting glass according to claim 1, wherein the melting step comprises: mixing the weighed raw materials uniformly and pouring the weighed raw materials into a corundum crucible or platinum crucible, placing the corundum crucible or platinum crucible with the raw materials into a high-temperature box-type furnace, melting the raw materials in the high-temperature box-type furnace to obtain the glass melt.

5. The preparation method for blue light emitting glass according to claim 4, wherein the heating temperature in the high-temperature box-type furnace is 1500~1700° C.

6. The preparation method for blue light emitting glass according to claim 1, wherein the post-treating step comprises: placing the transparent glass in an annealing furnace, preserving the transparent glass for 2~20 h under reducing atmosphere at a temperature that has risen to 650~1050° C., cooling the transparent glass to room temperature and then obtaining the blue light emitting glass; wherein the reducing atmosphere is CO, $H_2$, a mixed gas of $N_2$ and $H_2$ or an atmosphere with carbon inside.

7. The preparation method for blue light emitting glass according to claim 6, wherein the reducing atmosphere is a mixed gas composed of 95% $N_2$ and 5% $H_2$ in volume ratio or composed of 97% $N_2$ and 3% $H_2$ in volume ratio.

* * * * *

UNITED STATES PATENT AND TRADEMARK OFFICE
CERTIFICATE OF CORRECTION

| | |
|---|---|
| PATENT NO. | : 8,741,178 B2 |
| APPLICATION NO. | : 13/377569 |
| DATED | : June 3, 2014 |
| INVENTOR(S) | : Mingjie Zhou, Wenbo Ma and Zhaopu Shi |

It is certified that error appears in the above-identified patent and that said Letters Patent is hereby corrected as shown below:

Title Page:

Item (73) the corrected name of the assignee should be "Ocean's King Lighting Science & Technology Co., Ltd." instead of "Ocean's King Lighting & Technology Co., Ltd."

Signed and Sealed this
Ninth Day of September, 2014

Michelle K. Lee
*Deputy Director of the United States Patent and Trademark Office*